(12) United States Patent
Venkatesan et al.

(10) Patent No.: US 6,574,348 B1
(45) Date of Patent: Jun. 3, 2003

(54) TECHNIQUE FOR WATERMARKING AN IMAGE AND A RESULTING WATERMARKED IMAGE

(75) Inventors: Ramarathnam Venkatesan, Redmond, WA (US); Mariusz Jakubowski, Bellevue, WA (US); Thathachar S. Jayram, Yorktown Heights, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/390,271

(22) Filed: Sep. 7, 1999

(51) Int. Cl.⁷ .............................................. G06K 9/100
(52) U.S. Cl. ...................... 382/100; 382/235
(58) Field of Search ................................ 382/100, 251, 382/232, 202, 235, 248, 243, 250, 253; 283/113, 77, 74; 380/51, 54, 202, 207, 208

(56) References Cited

U.S. PATENT DOCUMENTS

| | | | | |
|---|---|---|---|---|
| 5,875,249 A | * | 2/1999 | Mintzer et al. | 380/54 |
| 5,960,081 A | * | 9/1999 | Vynne et al. | 380/10 |
| 6,094,483 A | * | 7/2000 | Fridrich et al. | 380/28 |

OTHER PUBLICATIONS

J. Fridrich, "Hybrid Watermark for Tamper Detection in Digital Images", International Symposium on Signal Processing and its Applications Proceedings, Aug. 1999 pp. 301–304.

Yeung et al, "An Invisible Watermarking Techniqlue for Image Verification", *International Conference on Image Processing*, Oct. 26–29, 1997, Santa Barbara, CA, pp. 680–683.

Wong, "A Watermark for Image Integrity and Ownership Verification", *Proceedings of Conference on the Society for Imaging Science and Technology*, May 17–20, 1998, Springfield, VA, pp. 374–379.

\* cited by examiner

*Primary Examiner*—Jayanti K. Patel
*Assistant Examiner*—Seyed Azarian
(74) *Attorney, Agent, or Firm*—Lee & Hayes, PLLC (57) ABSTRACT

Apparatus and an accompanying method, for generating a cryptographic identifier for a non-marked image and embedding that identifier within the image itself in order to generate a "watermarked" image; for subsequently detecting that watermark in a test image; and the watermarked image so formed. First, pixel values for a non-marked image are transformed, either directly or after being enhanced, into a series of transform coefficients. A set of pseudo-random perturbation values which collectively constitute the watermark is determined wherein each of these values is heuristically selected, such that all these values collectively satisfy a plurality of different mathematical constraints and each such value preferably equals a relatively small value in a predefined range. These perturbation values are then added to the transform coefficients. Resulting perturbed coefficients are then inversely transformed back to pixel values to form the watermarked image. To detect whether a test image contains the watermark and hence is a copy of the watermarked image, the pixel values for the test image are transformed to yield transform coefficients. A plurality of different mathematical tests or a majority type rule is then used, in conjunction with the perturbation values, previously used to create the watermark, and these transform coefficients to determine whether the perturbation values collectively exist in the test image, and hence whether the watermark is present or not.

46 Claims, 7 Drawing Sheets

FIG. 3 IMAGE MARKING

FIG. 4 (PRIOR ART) WATERMARK RECOVERY PROCESS

FIG. 5

TECHNIQUE FOR WATERMARKING AN IMAGE AND A RESULTING WATERMARKED IMAGE

BACKGROUND OF THE DISCLOSURE

1. Field of the Invention

The invention relates to image watermarking, particularly a technique, both apparatus and an accompanying method, for generating a highly secure cryptographic identifier, i.e., a watermark, for a non-marked image and embedding that watermark within the non-marked image itself in order to generate a "watermarked" image; for subsequently detecting that watermark in a test image; and the watermarked image so generated. By detecting whether an appropriate watermark is present or not in the test image, an image owner can readily, accurately and automatically determine whether the test image is a duplicate of the non-marked image.

2. Description of the Prior Art

Images has always seen widespread use as a form of human communication, whether for education, entertainment, art or otherwise. Information can be conveyed in a single image far more efficiently and with significantly greater impact to its viewer than if the same information were to be described in textual form.

Historically, and even as recently as a decade or so ago, equipment for electronically scanning, storing and manipulating images was rather expensive—which, in situations where cost was a prime concern, tended to limit the use of images to printed media. However, this is no longer the case. The widespread use and adoption of personal computers (PCs) and associated peripheral equipment, coupled with their continually decreasing price and increasing sophistication, has led to a revolution in electronic communication, particularly including imagery. Image processing equipment, such as sufficiently high resolution color scanners (e.g., 1200 dpi (dots/inch)), software for accurately manipulating and processing image data, and color printing devices that are capable of rendering satisfactory output images, that was once cost-prohibitive for all but professional advertisers, graphics artists and publishers, is now affordable for a significant number of PC users. As such, individuals and businesses alike are now purchasing such equipment, with the result being that images, now being cost-effective and rather easy to electronically handle, process and manipulate, is seeing explosive use in electronic communication.

Nowhere is this effect more apparent than in the World Wide Web. Web site owners are increasingly incorporating image data into their web pages for dissemination to their visitors.

However, not unexpectedly, with the widespread use of images comes a growing threat of image piracy and image counterfeiting. An electronic image file, being digital in nature, can be duplicated just as easily as any other digital file can. Hence, image owners are increasingly noticing that their images are being illicitly duplicated and disseminated. This is particularly prevalent with web site imagery where image files, once having been downloaded by a web server to a third party client browser for local display, can themselves be readily extracted from a web page, saved and copied. Frequently, an image obtained in this fashion by a third party(ies) from one web site(s) are being incorporated by that party into a web site(s) (s)he maintains or otherwise disseminated by that party. Such copying, where the image is not in the public domain, effectively frustrates the owner of the image in seeking rightful compensation for use of that image.

Various techniques are widely known in the art to reduce the incidence of illicit copying on the web, However, all of them are deficient to some extent.

A first technique utilizes an automatic approach. Here, an image owner utilizes a web crawler to successively visit one web site after another. For each site being visited, the crawler downloads corresponding image files for all images available at that site and compares each such file against stored data for each image owned by that person to detect whether any of the former images is a copy of any of the latter images, and if such a copy is found, provides appropriate notification to the image owner. Unfortunately, as a result of various comparison algorithms that could be used, a relatively slight change to an image can defeat a finding of similarity between it and another image—even though to an human observer the two images are, visually speaking, very similar. Hence, this technique, being rather easy to frustrate, has proven to be inadequate.

A second technique relies on a manual approach. Simply stated, a human observer could visit a web site and examine each image provided by that site against a set of images to determine any matches between the two. A human observer could provide necessary interpretative skills to find image similarity where a comparison algorithm would not. However, at present, the number of sites accessible on the web is not only huge but also continues to exhibit exponential growth with no apparent decrease in its growth rate in sight. Hence, the sheer magnitude of the manual task of just visiting each and every web site, let alone comparing images accessible through each such site, renders this approach quite infeasible.

Another conventional technique that could be used relies on incorporating a watermark into an image and then detecting its presence in a suspected image copy. Here, to create the watermark, pixel values that collectively form an image are transformed into another domain, i.e., a spatial frequency domain, to yield a set of transform coefficient values. The watermark constitutes a set of pseudo-random perturbation values ($\gamma$) (generated through use of a secret key "k"), wherein each of these values is heuristically selected and lies within a predefined range. Each perturbation value is then added to its corresponding transform coefficient value to yield a "watermarked" image. To detect the watermark, the pixel values in a test image (i.e., a purported image copy) are transformed to yield transform coefficients which are themselves then tested, using the perturbation values, to detect the presence of the watermark.

Specifically, pixel values for an input image, I, to be watermarked are first transformed via, e.g., a DCT (discrete cosine transform), Fourier or wavelet transform, into the spatial frequency domain to yield transform coefficients. The top N coefficients containing approximately 90% of the image power, i.e., $M_1, M_2, \ldots, M_N$, are selected. Thereafter, given a secret "seed" value k, a sequence of N pseudo-random perturbation values $\gamma_1, \gamma_2, \ldots, \gamma_N$ is generated.

To detect the watermark in a suspected image copy, that image is first transformed into a corresponding set of transform coefficients. Certain coefficients are then selected in the same manner set forth above to yield selected coefficients. The selected coefficients are then tested through a single mathematical test, in conjunction with the perturbation values that might have been used to mark the image, so as to detect the presence of these perturbation values, $\gamma$, in the suspected copy.

Unfortunately, this watermark-based approach, produces a rather insecure watermark which is likely to be quite susceptible to third party jamming.

Therefore, a need exists in the art for a technique for effectively detecting whether an image, such as one stored digitally, is a copy of another. Preferably, such a technique could be used with testing images stored in web sites against stored image files and should be extremely difficult, if not essentially impossible, for a third party to circumvent.

Ideally, such a technique should provide a highly secure identifier, such as a watermark, for an image where the identifier could be embedded within the image itself and would be extremely difficult, if not effectively impossible, to remove or frustrate. Through such a technique, detecting whether an supposed replica is a copy of an image could occur by merely detecting whether the replica contains the particular watermark associated with the image or not. If the replica were to contain that watermark, then upon consulting a database of authorized users, an image owner could conclusively determine whether the replica is an authorized or illicit (i.e., "pirated") copy. Advantageously, such a technique would be particularly amenable to being automatically implemented, such as in a PC or workstation, thereby obviating a need for laborious manual image comparisons.

SUMMARY OF THE INVENTION

Our present invention advantageously satisfies this need by creating a highly secure watermark for an original (in the sense of being an "input") image, by transforming data, i.e., pixel values and specifically pixel intensity values, for that image into a series of transform coefficients; adding corresponding, though relatively small, but specifically determined pseudo-random perturbations to these coefficients, wherein all the perturbations collectively satisfy a plurality of mathematical constraints; and then creating a "watermarked" version of this image by applying a reverse transformation on the perturbed coefficients to yield resulting image data. The resulting image data, rather than original image data, is then used whenever that image is to be publicly disseminated, whether by distribution through a web server, by diskette or by any other insecure distributional vehicle. These perturbations collectively define the watermark.

Advantageously, the watermark, while being basically imperceptible to a viewer, is essentially, if not totally, impossible to remove from the image (i.e., for all intents and purposes, is "indelible") and hence is highly secure against tampering by a third party. Hence, any subsequent replica of the watermarked image will itself also contain the watermark. As such, these replicas can be automatically detected, without a need for human intervention, by simply analyzing whether a given ("test") image contains the watermark (i.e., it is an image replica) or not.

In accordance with our specific inventive teachings, to provide a watermark that is sufficiently secure against third-party tampering, and by so doing generate an "enhanced" watermark, the perturbation values are specifically chosen not to collectively satisfy just one mathematical constraint, but rather a plurality of different such constraints. In particular, K random subsets $(S_1, S_2, \ldots, S_K)$ of the N integer values $(S_j \subseteq_R \{1, 2, \ldots, N\})$ are selected with, e.g., the particular perturbation values designated by each subset of integers multiplied by corresponding transform coefficients (i.e. products) sum to a predefined value, e.g., zero $$\left( \sum_{j \in S_i} \gamma_j M_j = 0 \right)$$

or a non-zero value $\theta_i$. The individual perturbation values, $\gamma_i$, are preferably kept relatively small, e.g., ±1 for processing simplicity, to render essentially imperceptible any visually apparent artifacts in the watermarked image that might otherwise arise from use of larger perturbation values.

Thereafter, a corresponding perturbation value $\gamma_i$ is added to each transform coefficient, $M_i$ (where $i=1, 2, \ldots, N$), such that $M_1 \leftarrow M_1+\gamma_1$, $M_2 \leftarrow M_2+\gamma_2$ and so on. Hence, each transform coefficient $M_i$ in the image to be watermarked is perturbed by a specific predefined amount to define a gross perturbation which constitutes the watermark.

To detect the enhanced watermark in a suspected image copy (i.e., test image, I'), that image is first transformed into a corresponding set of transform coefficients. Selected coefficients are then collectively tested by utilizing a series of different mathematical tests, on different corresponding subsets of these selected coefficients, to detect whether at least a majority of the perturbation values are present in the test image.

In particular, the perturbation values, for each of the K subsets of the random integer values for the test image and associated with the watermark, are separately tested to determine whether a majority of the subsets of the pseudo-random perturbation values collectively exist in the test image. Specifically, for each such subset, an expression $$Q_i = \sum_{j \in S_i} \gamma_j r_j$$

is computed,
where $r_j$ is the $j^{th}$ received transform coefficient for the test image and $S_i$ is the $i^{th}$ subset of randomly selected integer values. This expression is separately computed for each of the K subsets. If a majority of $Q_i$ values exceeds a predefined threshold, then the test image contains the enhanced watermark, $\gamma$, and hence is a copy;
otherwise, it is not. Alternatively, an "amplified" approach may be used. Specifically, once each $Q_i$ value is determined, an expression $L_i=[C/\text{Normalize}(Q_i)]$ is calculated, where C is an empirically determined constant. Then, given all the $L_i$ values, a conventional majority type rule can be used to determine if the enhanced watermark, $\gamma$, is present or not in the test image.

As a feature of our invention, the difficulty of effectively jamming the watermark (i.e., successfully altering it) significantly increases, as hence the security provided by the watermark, as the number (K) of subsets increases. This number can be set to a value that imparts a desired level of security to the watermark consistent with computational resources then available to process each test image in order to detect the watermark.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in a wide range of applications for uniquely and indelibly marking a collection of data values, and then detecting, from such collections then being distributed, whether a duplicate(s) of the marked collection exists. This collection can be any sizeable dataset, such as an image, a database or the like, where, given the nature of the data itself, an embedded identifier, collectively formed of relatively small perturbations in a transformed data space, will only have minimal, if any, adverse affect on the ultimate processing and/or, e.g., in the case of an image, the display of that image. To simplify the following discussion, we will describe our present invention in the context of use with images, and particular with datasets being image data files.

Unfortunately, image piracy, particularly unauthorized copying of images posted on Internet sites and re-posting of unauthorized image copies on third party web sites, is becoming rather commonplace. Such piracy denies adequate compensation to the legitimate owners of the images.

Figure 1:
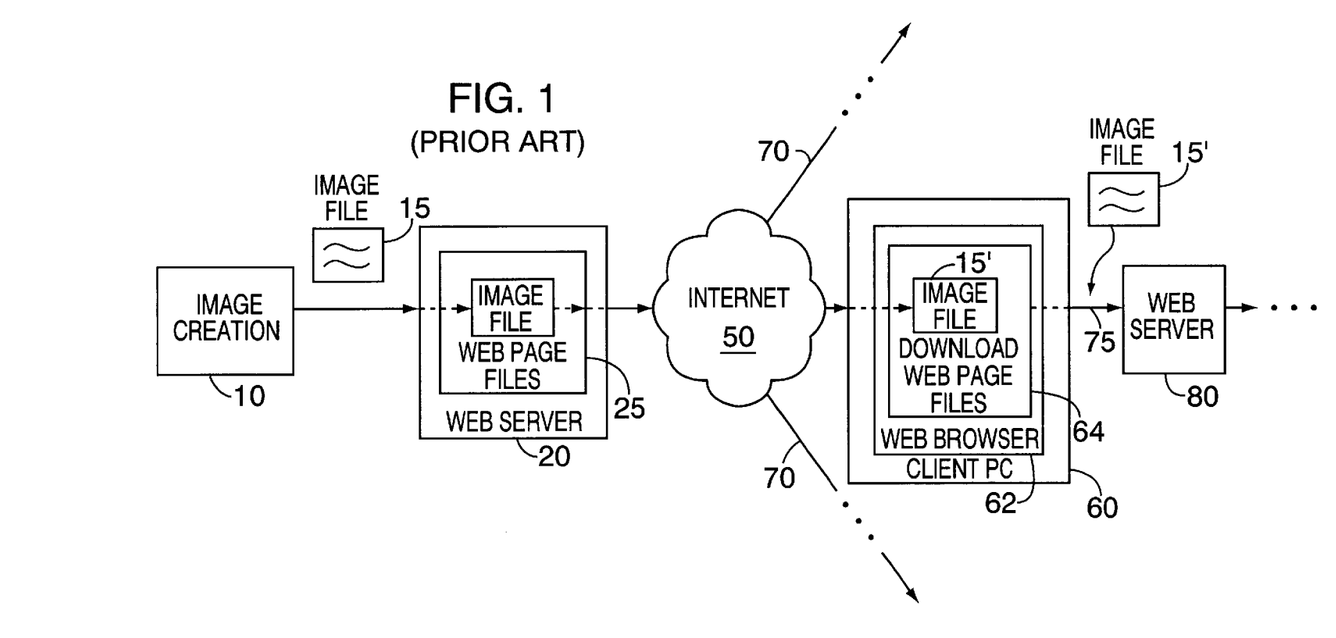
FIG. 1 depicts a high-level block diagram of a manner through which image files are commonly and conventionally duplicated, on an unauthorized basis, for use with third party web sites, i.e., "image piracy"

Such piracy is depicted, in elementary form, in FIG. 1. Here, a web site owner creates, as symbolized by block 10, an original image which yields digital image file 15. The owner then links this file to web pages 25 and posts the file for the pages and the image to web server 20 for subsequent public access through, e.g., Internet 50. A remote third party by executing web browser 62, at client PC 60, may establish a connection through Internet 50 to server 20 and download web pages 25, including image file 15, to form downloaded page files 64. Quite often, if the third party likes the image embodied by image file 15, that party may simply locally save the image file, as replica image file 15', apart from the web page files. Thereafter, that party may simply, as symbolized by line 75, incorporate that replica image file into his.(her) own web pages and hence transfer the replica image file to his(her) web server 80, from which other individuals could access that same image, and so forth. In addition, other third parties, as symbolized by lines 70, could directly access web server 20 and download image file 15 and, in turn, distribute replicas of the image.

As typically occurs, none of these third parties may be licensed to duplicate the image stored within file 15. As such, the original creator of this image is effectively denied appropriate license payment for all the replicas (e.g., image files 15') made and distributed by all the third parties.

Not only is unauthorized copying and distribution, i.e., "image piracy", rather difficult to prevent, it is quite difficult to automatically detect, with any decent degree of accuracy, and infeasible to detect manually. In that regard, rather slight changes between a posted image and its replica, by a third party, may well camouflage the former from being automatically detected as a replica when, in fact, it was so derived. Replicas can be detected through manual detection; however, given the exploding number of web sites and images posted on such sites, doing so is now quite impractical and becoming even more so.

The general problem of piracy is of course not limited to images. In that regard, for several centuries, if not longer, society has been plagued with the problem of how to effectively detect unauthorized copies of a document, whether the copies be the result of counterfeiting, piracy or some other form(s) of illicit interception and/or document tampering.

One conventional approach, as it relates to document copying, is to incorporate a so-called "watermark" into a document. Generally speaking, a watermark is simply an insignia produced by a permanent local variation in a physical or chemical characteristic(s), e.g., structure or opacity, of the document. The watermark remains invisible to, e.g., a human eye, unless the document is subjected to a predefined watermark recovery process, such as holding the document at a particular angle to a light source, subjecting the document to light of a predefined wavelength (such as ultraviolet), or, in the case of a true watermark, wetting the document with water. The specific process needed to reveal the watermark is governed by the manner through which the watermark altered the underlying characteristic(s) of the document itself. The presence of the watermark signifies to the holder of the document that the document, if no copies have been legally made, is an original, or if present on a known copy, authenticates that copy as being legitimate.

Figure 2:
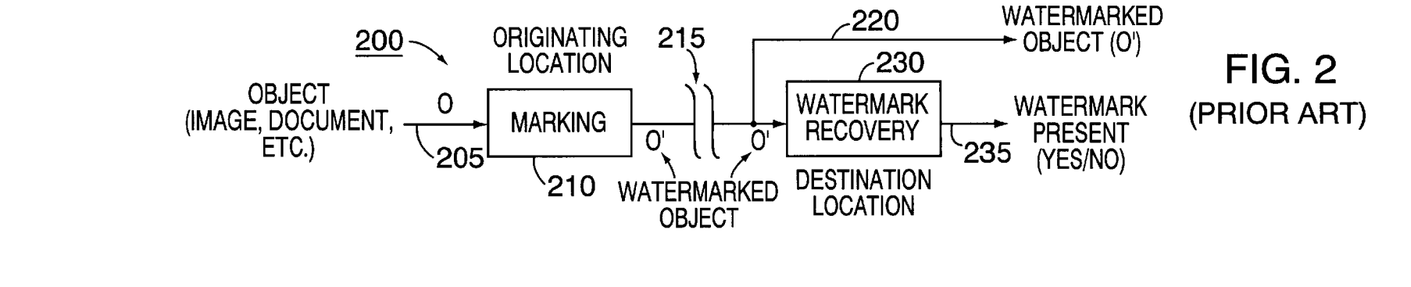
FIG. 2 depicts a simplified high-level block diagram of conventional watermarking process 200.

FIG. 2 depicts a simplified high-level block diagram of conventional watermarking process 200. In essence, an object, O, to be protected, whether it be a printed image, a document, a piece of paper currency or some other such item, is applied, as symbolized by line 205, to marking process 210 situated at an originating location. This process creates a watermark and embeds it in the object to create a watermarked object, O'. The watermarked object is then eventually transported through insecure channel 215, whether it be, e.g., transit through a public carrier or, as in the case of currency, public distribution, to a destination location. At the destination, the watermarked object is subjected to watermark recovery process 230 which attempts to recover the watermark from the object and, based on a result of the recovery process, indicates, as symbolized by output line 235, whether the watermark is present or not in object O'. This indication can be used to signify whether watermark object O', then situated, as symbolized by line 220, at the destination is legitimate or not. Since the legitimacy of the document is directly governed by the security of the watermark, the watermark itself must be as difficult as possible for a third party to copy or alter.

Advantageously, we surmount the problems inherent in the art of detecting image piracy by creating and embedding a highly secure watermark within an input (in the sense of an original) image file, and then automatically detecting whether that watermark is present in an alleged replica image.

Broadly speaking, the highly secure watermark is created for an original image, by transforming data for that image, i.e., pixel values and specifically pixel intensity values, into a series of transform coefficients; adding corresponding, though relatively small, but specifically determined pseudo-random perturbation values, that satisfy a plurality of mathematical constraints, to these coefficients; and then creating a watermarked version of this image by applying a reverse transformation on the perturbed coefficients to yield resulting image data. The resulting image data, rather than original image data, is then used whenever that image is to be publicly disseminated, whether by distribution through a web server, by diskette or by any other insecure distributional vehicle. These perturbations collectively define the watermark.

Advantageously, the watermark, while being basically imperceptible to a viewer, is essentially, if not totally, impossible to remove from the image (i.e., for all intents and purposes, is "indelible") and hence is highly secure against tampering by a third party. Hence, any subsequent replica of the watermarked image will itself also contain the watermark. As such, these replicas can be automatically detected, without a need for human intervention, by simply analyzing whether an image "under test" contains the watermark (i.e., it is an image replica) or not.

Figure 3:
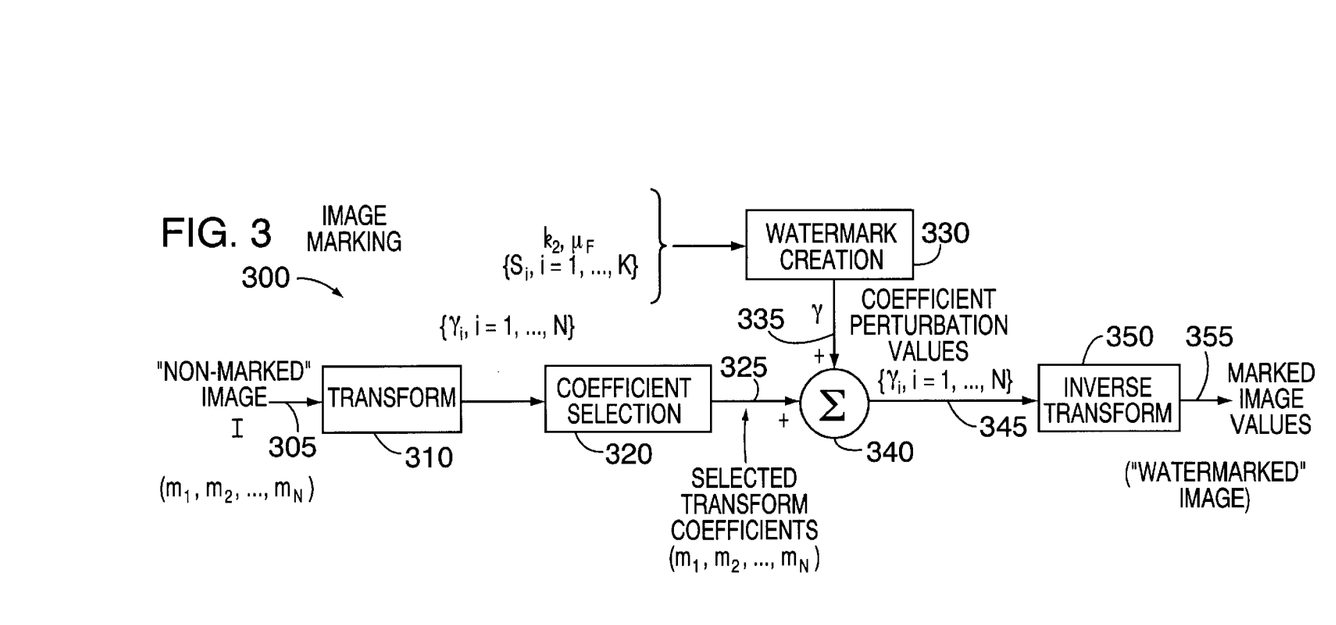
FIG. 3 depicts a high-level block diagram of process 300 for marking an image.
Figure 4:
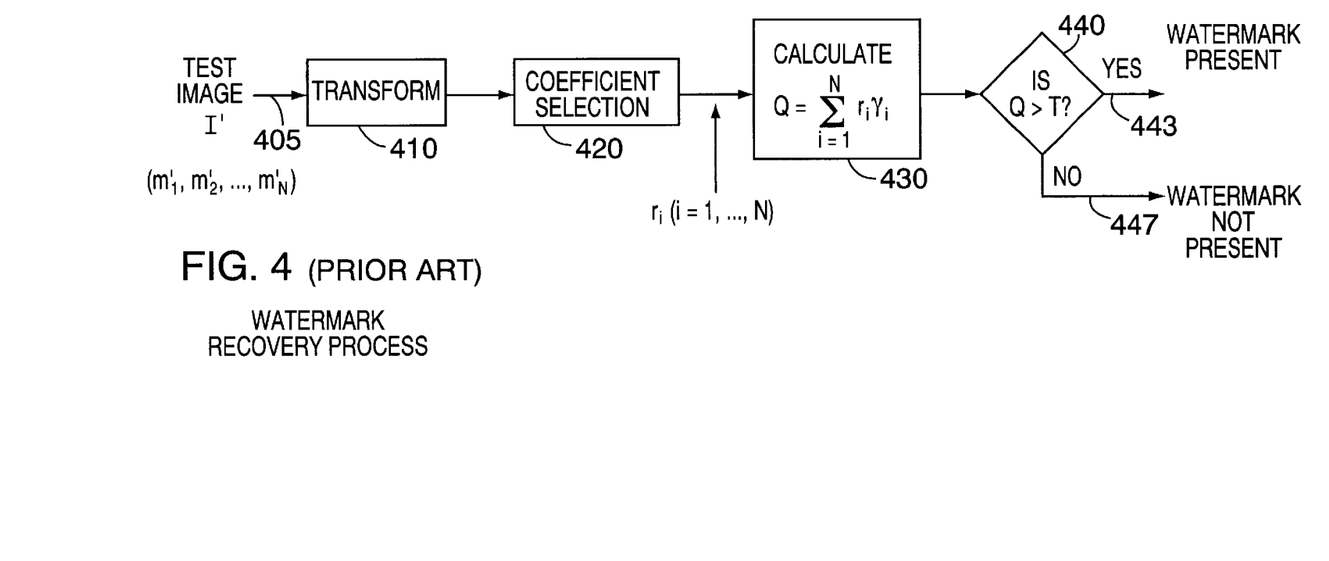
FIG. 4 depicts a high-level block diagram of well-known watermark recovery process 400 for recovering a conventional watermark from an image.
Figure 4B:
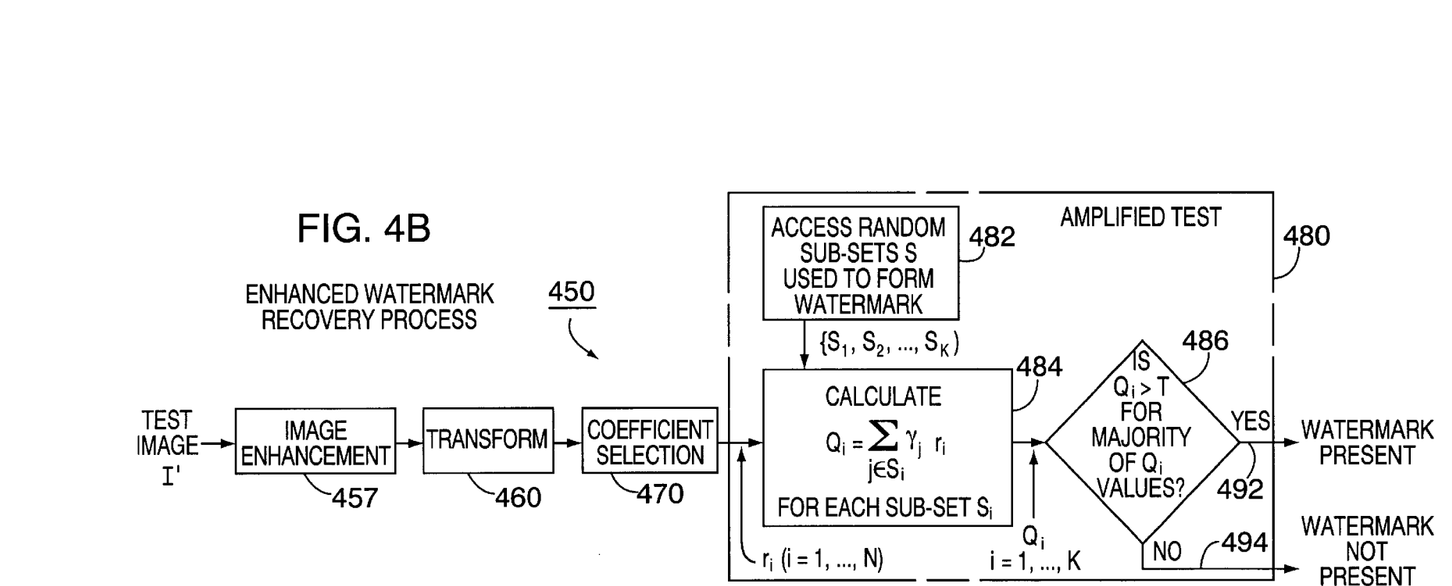
FIG. 4B depicts a high-level block diagram of our inventive process 450 for recovering an enhanced watermark from a image.

With this overview in mind, we will now turn to FIGS. 3, 4A and 4B which depict high-level block diagrams of image marking and watermark recovery processes.

To facilitate understanding, we will first elucidate a conventional approach for generating and detecting image watermarks, followed by discussing our inventive approach. The conventional approach, shown in FIGS. 3 and 4A and discussed first, relies, during recovery, on performing a single test for a set of known perturbation values. In contrast, our present invention, shown in FIGS. 3 and 4B, relies, during recovery, on performing multiple, though different, tests for the perturbation values. As a result of creating the watermark by using perturbation values that collectively satisfy multiple mathematical constraints and subjecting the perturbation values obtained from a test image to multiple different mathematical tests, our inventive approach is significantly more difficult for an adversary to effectively jam than is the conventional approach, thus providing significantly enhanced security. As such, we will refer to the watermark created by our inventive approach as an "enhanced" watermark.

FIG. 3 depicts process 300 for forming a watermark for an image. As generally shown, this process is common, though with specific differences as discussed below, to both the conventional and our present inventive approaches.

In particular, to create a conventional watermark, pixel values, $m_1, m_2, \ldots, m_n$ (where n is an integer representing a total number of pixel values), that collectively form an input image, I, are applied, as symbolized by lead 305, to transform operation 310. These pixel values can represent values for any color space of interest, e.g., a value for a single range (chrominance) of coloration or a value for a hue of a red, green, blue (RGB) color or other color of interest in that space. The particular color space representation is not critical provided that the same representation is consistently used for both to create the image watermark and subsequently recover it.

The transform operation, which is typified by a Fourier, discrete cosine (DCT) or wavelet transform, transforms the pixel values into another domain, i.e., here a spatial frequency domain, to yield a set of transform coefficient values. The specific transform used is also not critical provided the same transform, though in inverse directions, is used to generate and recover the watermark. Moreover, the transform used need not be one that transforms the pixel values to the frequency domain; transforms that utilize other domains could be used—again provided these transforms are consistently used for both creating and recovering the watermark. To simplify the following discussion, the inventive embodiments will illustratively employ a frequency transformation.

The resulting transform coefficient values, produced by operation 310, are applied to coefficient selection process 320 which selects in accordance with a predefined selection metric certain desired ones $(M_1, M_2, \ldots, M_N)$ of these coefficients. One such metric chooses a random subset of a set of N coefficients in the $90^{th}$ percentile of power in the image; the other coefficients are simply discarded. Other predefined selection metrics can be used provided that this metric is consistently applied both in marking an image and in recovering the watermark from it (particularly a suspected replica of it).

Once the particular transform coefficients are selected, those coefficients, $M_1, M_2, \ldots, M_N$, are applied, as symbolized by lead 325, to one input of vector summing operation 340. The other input to this summing operation, as symbolized by lead 335, is a set of relatively small pseudo-random perturbation values, which collectively constitute the watermark. These perturbation values are produced by watermark creation process 330. This process generates these perturbation values in response to a secret seed value "k" (where k is a predefined integer and, as a secret value, not publicly known) and a predefined value $\mu_F$. The perturbation values, $\gamma_i$, are kept relatively small, e.g., ±1 for processing simplicity, to render essentially imperceptible any visually apparent artifacts in a resulting watermarked image that might otherwise arise from use of larger perturbations.

Specifically, for a conventional watermark, a sequence of N pseudo-pseudo-random secret coefficients $\gamma_1, \gamma_2, \ldots, \gamma_N$, as the perturbation values, is generated using the secret value "k" as a seed, where all these coefficients collectively satisfy a single mathematical constraint, as given by equations (1) and (2) below:

$$\left[\sum_i^N \gamma_i / N\right] \leq \mu_F \quad (1)$$

$$\sum_i^N \gamma_i^2 \leq \sigma_F \quad (2)$$

where: $\mu_F$ and $\sigma_F$ are both empirically defined constants.

Although each perturbation value, $\gamma_i$, is preferably ±1, this value is not so limited and in fact can be any numerical value that satisfies equation (1) above.

In accordance with our specific inventive teachings, to enhance the security of a watermark against tampering, and by so doing generate the "enhanced" watermark, K random subsets $(S_1, S_2, \ldots, S_K)$ of integers (S) [$S_j \subseteq_R \{1,2, \ldots, N\}$] are first selected. Rather than being randomly picked, the value of K can be chosen to impart a desired level of security to the watermark consistent with computational resources then available to subsequently detect the watermark in each test image. In any event, then, using secret value "k" as a seed, secret pseudo-random perturbation values are determined such that, e.g., the particular perturbation values, designated by the integers in each subset when multiplied by corresponding transform coefficients (i.e. products) sum to a predefined value, e.g., zero $$\left(\sum_{j \in S_i} \gamma_j M_j = 0\right)$$

or a non-zero value $\theta_i$, hence all the perturbation values collectively satisfying K separate mathematical constraints. Each of the subsets ($S_i$) designates members of a subset of perturbation values ($\gamma_j$) and transform coefficients ($M_j$). Thus, as one can appreciate, the perturbation values used in our inventive approach collectively satisfy not just one constraints as conventionally occurs, but rather a plurality of different mathematical constraints.

Through vector summing operation 340, each resulting perturbation value $\gamma_i$ is then added to a corresponding selected transform coefficient value, $m_i$, to yield a "watermarked" image in the transform domain, such that $M_1 \leftarrow M_1 + \gamma_1$, $M_2 \leftarrow M_2 + \gamma_2$ and so on. Resulting perturbed transformed coefficients are then applied, as symbolized by lead 345, to inverse transformation operation 350 which, in turn, transforms the watermarked image back to its original (optical) domain. Operation 350 is the inverse of the transform used in operation 310. The "marked" pixel values for the resulting watermarked image collectively appear as output, as symbolized by lead 355.

We will now turn to our discussion of conventional and inventive recovery processes shown in FIGS. 4A and 4B. To simplify reader understanding, the reader should also simultaneously refer to FIG. 3 throughout the following discussion of FIGS. 4A and 4B.

FIG. 4 generally depicts conventional process 400 for recovering a non-enhanced watermark from a test image. The assumption, subject to confirmation by process 400, is that the test image contains a non-enhanced watermark created through process 300 (shown in FIG. 3).

To detect such a watermark in the test image, I', pixel values ($m_1'$, $m_2'$, . . . , $m_n'$) for that image are first transformed, through transform operation 410, into a corresponding set of transform coefficients. This operation is identical to transform operation 310 used to mark the image. The resulting transform coefficient values, produced by operation 410, are applied to coefficient selection process 420 which selects certain of these coefficients, $r_i$ (i=1, . . . , N), in the same manner as does operation 320. The selected coefficients are then tested, via operation 430, by calculating a single mathematical test, given by equation (3) below, to detect the collective presence in the test image of the secret perturbation values, $\gamma$, previously used to form the watermark:

$$Q = \sum_{i=1}^{N} r_i \gamma_i \tag{3}$$

where: $r_i$ is the $i^{th}$ received transform coefficient.

Once this equation is calculated for the selected transform coefficients, then a resulting value for Q is compared, via operation 440, against a predefined threshold value, T. If the value of Q exceeds the threshold value, then operation 440 produces an output, as symbolized by line 443, signifying that the watermark is present in the test image. Otherwise, operation 440 produces an output, as symbolized by line 447, signifying that the watermark is not present in the test image.

FIG. 4B generally depicts our inventive process 450 for recovering an enhanced watermark from a test image. The assumption, subject to confirmation by process 450, is that the test image contains an enhanced watermark created through process 300 (shown in FIG. 3).

To detect such a watermark in the test image, I', pixel values ($m_1'$, $m_2'$, . . . , $m_n'$) for that image are first applied, as symbolized by line 455, to and processed through conventional contrast-enhancement process 457. Though this enhancement operation could be omitted, we have found that it accentuates the watermark. Resulting pixel values, for the enhanced image are then transformed, through transform operation 460, into a corresponding set of transform coefficients. This operation is identical to transform operation 310 used to mark the image. The resulting transform coefficient values, produced by operation 460, are applied to coefficient selection process 470 which selects certain of these coefficients, $r_i$ (i=1, . . . , N), in the same manner as does operation 320. A probabilistic selection procedure (e.g., based on sorting by numerical values and thresholding) can be employed here to pick out a significant fraction of the coefficients originally used during watermarking. The selected coefficients are then tested by amplified test operation 480. In essence, operation 480 determines whether sum-products for a majority of the subsets of the secret perturbation values present in the test image exceed a predefined corresponding threshold value(s). To do so, operation 480 first accesses, through operation 482, the K subsets, $S_i$ (i=1, 2, . . . , K), of random integer values previously used by process 300 in forming the enhanced watermark. For each such subset, operation 484 calculates a sum-product for a corresponding subset of the perturbation values, and corresponding transform coefficients, according to equation (4) as follows:

$$Q_i = \sum_{\substack{\text{for all} \\ j \in S_i}} \gamma_j r_j \tag{4}$$

where: $r_j$ is the $j^{th}$ received transform coefficient.

As one can appreciate, the selected perturbation values obtained from the test image are collectively subjected to a multitude of different mathematical tests, rather than just one as conventionally occurs. Test operation 486 then determines if each one of a majority of the $Q_i$ values exceeds the predefined threshold, T. If so, then the test image contains the enhanced watermark, and, as symbolized by line 492, operation 486 produces an appropriate indication. In this case, test image I' is viewed as a copy (replica) of original image I. Otherwise, operation 486 concludes that the test image does not contain the enhanced watermark and produces an appropriate indication as symbolized by line 494.

Alternatively, operation 486 may implement an "amplified" approach rather than a threshold based test. Specifically, once each $Q_i$ value is determined, an expression $L_i=[C/\text{Normalize}(Q_i)]$ is calculated, where C is an empirically determined constant. Then, given all the $L_i$ values, a conventional majority type rule can be used to determine if the enhanced watermark, γ, is present or not in the test image.

With the above in mind, we will now describe a computer system and its accompanying software that can implement our present invention.

Figure 5:
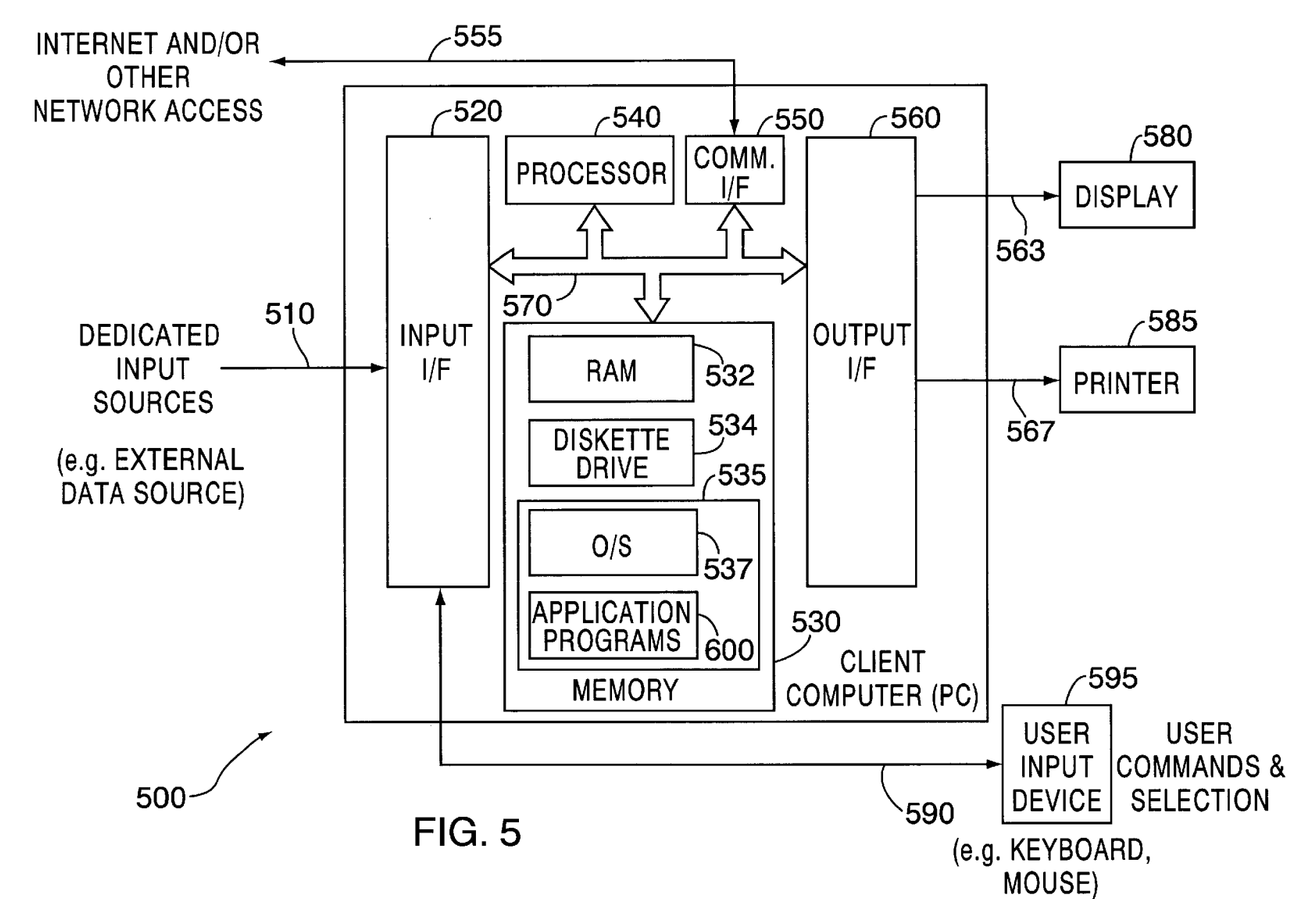
FIG. 5 depicts a high-level block diagram of computer system 500, illustratively a personal computer (PC), that can be used to implement our present invention.

FIG. 5 depicts a block diagram of personal computer (PC) 500 on which our present invention can be implemented. FIGS. 6–11 depict the salient software.

As shown in FIG. 5, client computer 500 comprises input interfaces (I/F) 520, processor 540, communications interface 550, memory 530 and output interfaces 560, all conventionally interconnected by bus 570. Memory 530, which generally includes different modalities, including illustratively random access memory (RAM) 532 for temporary data and instruction store, diskette drive(s) 534 for exchanging information, as per user command, with floppy diskettes, and non-volatile mass store 535 that is implemented through a hard disk, typically magnetic in nature. Mass store 535 may also contain a CD-ROM or other optical media reader (not specifically shown) (or writer) to read information from (and write information onto) suitable optical storage media. The mass store stores operating system (O/S) 537 and application programs 600; the latter illustratively containing marking and recovery programs 630 and 700 (see FIG. 6) which incorporate our inventive techniques. O/S 537, shown in FIG. 5, may be implemented by any conventional operating system, such as the WINDOWS NT operating system ("WINDOWS NT" is a registered trademark of Microsoft Corporation of Redmond, Wash.). Given that, we will not discuss any components of O/S 537 as they are all irrelevant. Suffice it to say, that application programs 600 execute under control of the O/S.

Incoming information can arise from two illustrative external sources: network supplied information, e.g., from the Internet and/or other networked facility, through network connection 555 to communications interface 550, or from a dedicated input source, via path(es) 510, to input interfaces 520. Dedicated input can originate from a wide variety of sources, e.g., a scanner, a dedicated link or an external database. In addition, input information can also be provided by inserting a diskette containing an input image file(s) into diskette drive 534 from which computer 500, under user instruction, will access and read that file(s) from the diskette. Input interfaces 520 contain appropriate circuitry to provide necessary and corresponding electrical connections required to physically connect and interface each differing dedicated source of input information to computer system 500. Under control of the operating system, application programs 600 exchange commands and data with the external sources, via network connection 555 or path(es) 510, to transmit and receive information typically requested by a user during program execution.

Input interfaces 520 also electrically connect and interface user input device 595, such as a keyboard and mouse, to computer system 500. Display 580, such as a conventional color monitor, and printer 585, such as a conventional laser printer, are connected, via leads 563 and 567, respectively, to output interfaces 560. The output interfaces provide requisite circuitry to electrically connect and interface the display and printer to the computer system. As one can appreciate, our present inventive image watermarking technique can operate with any type of digital image information regardless of the modalities through which client computer 500 will obtain, store and/or communicate that information.

Furthermore, since the specific hardware components of computer system 500 as well as all aspects of the software stored within memory 535, apart from the modules that implement the present invention, are conventional and well-known, they will not be discussed in any further detail.

Figure 6:
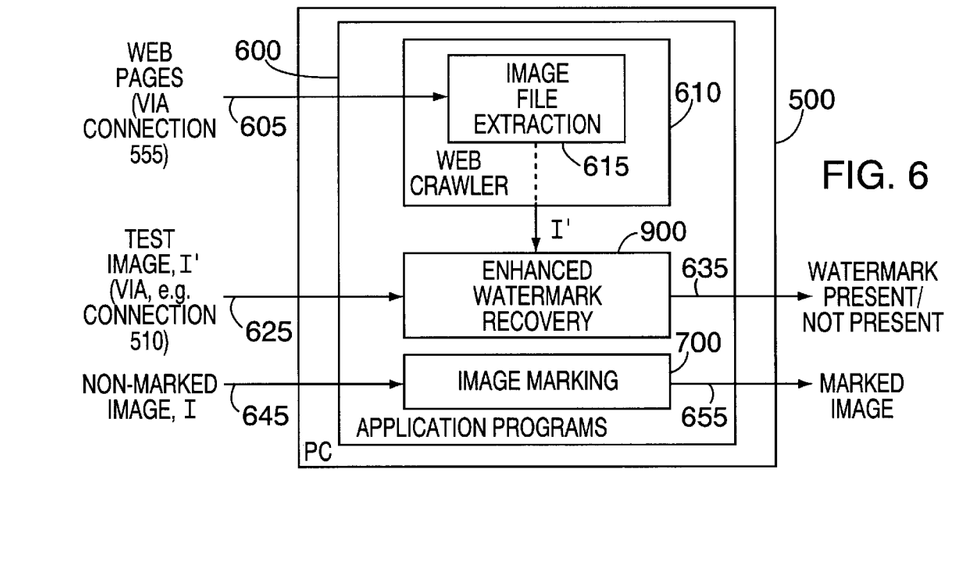
FIG. 6 depicts a high-level block diagram of application programs 600 shown in FIG. 5.

FIG. 6 depicts a high-level block diagram of application programs 600 that execute on PC 500 (see FIG. 5). As shown in FIG. 6, these programs contain web crawler 610, enhanced watermark recovery procedure 900 and image marking procedure 700.

In operation, and as shown in FIG. 6, web crawler 610 automatically and conventionally "crawls" the web, interrogating one web site after another, and downloading, via input 605, all web pages available at each site it visits. These pages are processed, within the web crawler, through image file extraction process 615 which extracts each image file (generally based on its file type as encoded in its file name suffix—e.g., *.JPEG, *.GIF and so forth) associated with every downloaded page. These image files are then routed, in succession, as test images, I', to enhanced watermark recovery procedure 900. Test images are also directly applied, as symbolized by input 625, to procedure 900, such as through connection 510 for a dedicated input source. Procedure 900, in the manner discussed above, in conjunction with enhanced recovery process 450 (as shown in FIG. 4B) determines whether each test image contains either an enhanced watermark and hence is a copy of a watermarked image generated through procedure 700. Procedure 900 provides an appropriate output indication as to the presence/absence of a watermark, on output 635, which can be used in subsequent processing. Such subsequent processing may involve interrogating an appropriate database (not shown) with an address (e.g., a uniform resource locator—URL) of the web site from which the image was downloaded and an indication of the presence/absence of the watermark to determine whether that image is a licensed copy for which a royalty has been paid or not and thus generate an appropriate response, such as, e.g., debiting an account with a predetermined royalty charge for that particular copy.

Image marking procedure 700 watermarks an input image, I as symbolized by input 645, in the manner discussed above in conjunction with procedure 300 (shown in FIG. 3.) with, as desired, an enhanced watermark to generate, as symbolized by output 655, a marked image.

Figure 7:
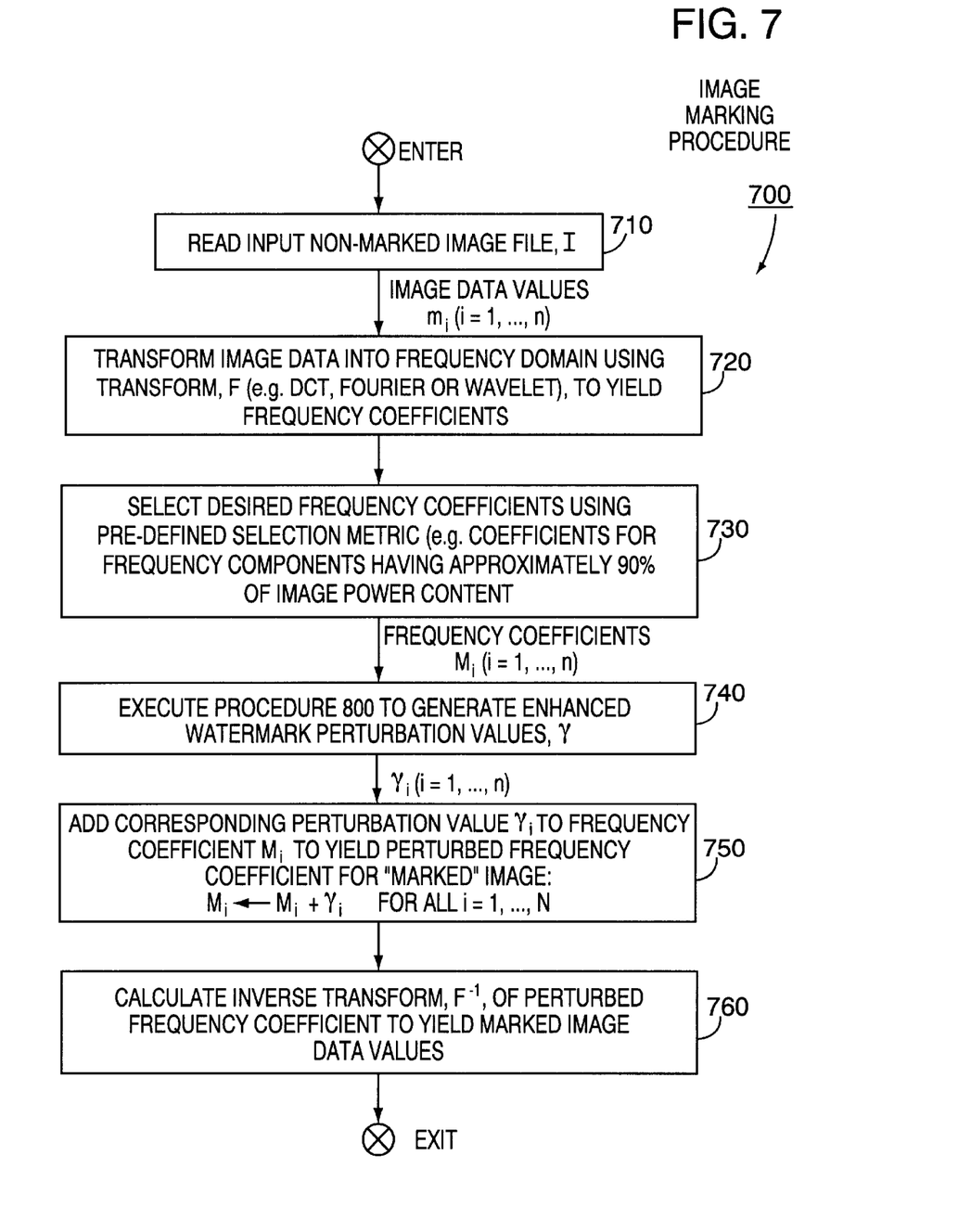
FIG. 7 depicts a flowchart of image marking procedure 700 that is executed within application programs 600 shown in FIG. 6.

FIG. 7 depicts a flowchart of image marking procedure 700 that is executed within application programs 600 shown in FIG. 6.

Upon entry into procedure 700, execution first proceeds to block 710. This block, when executed, reads an image file for an input non-marked image, I. Once this file is read, execution proceeds to block 720 which transforms image pixel values (i.e., $m_i$, where i=1, . . . , n) into the frequency domain using a predefined transform, F, such as the Fourier, DCT or wavelet transformation. Resulting frequency coefficients are applied to block 730 which, when executed, selects desired ones of these coefficients using a predefined selection metric. As discussed above, one such metric involves selecting a random subset of a set of coefficients in the $90^{th}$ percentile of power in the image. Once these coefficients are selected (i.e., $M_i$, where i=1, . . . , N), execution passes to block 740. This block executes procedure 800 to generate secret pseudo-random perturbation values, γ, for an enhanced watermark. The individual perturbation values, $\gamma_i$, provided by procedure 800 are preferably kept relatively small, e.g., ±1 for processing simplicity, to render essentially imperceptible any visually apparent artifacts in the watermarked image that might otherwise arise from use of larger perturbations.

Next, block 750 executes to update each selected transform coefficient by its corresponding perturbation value as per equation (5) as follows:

$$M_i \leftarrow M_i + \gamma_i \quad (5)$$

Once this occurs, execution proceeds to block 760 which processes the updated transform coefficients through an inverse transformation, $F^{-1}$, to yield optical domain (e.g., chrominance) data for the watermarked image. Thereafter, execution exits from procedure 700.

Figure 8:
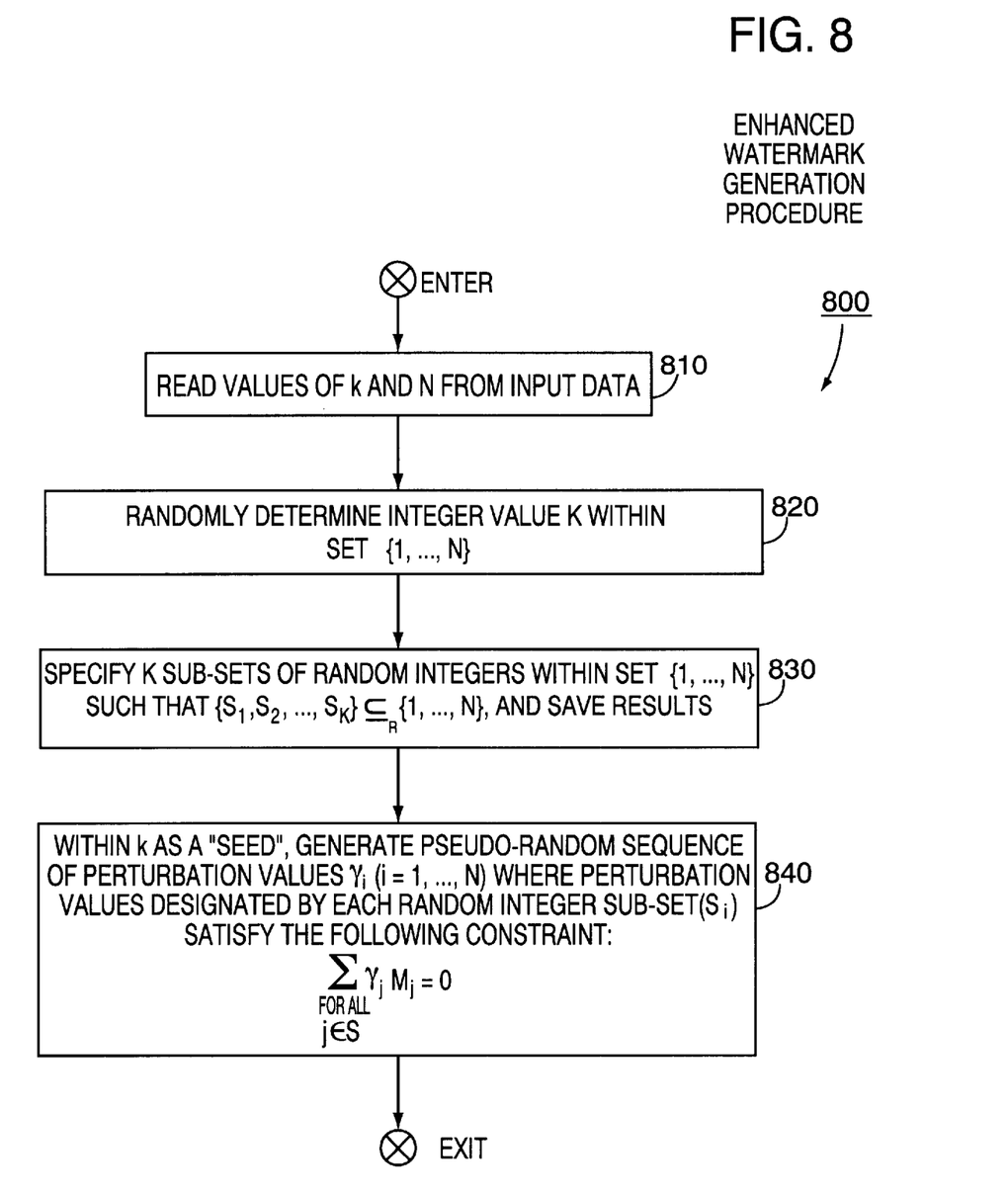
FIG. 8 depicts a flowchart of enhanced watermark generation procedure 800 that is executed by procedure 700 shown in FIG. 7 to generate an enhanced watermark.

FIG. 8 depicts a flowchart of enhanced watermark generation procedure 800 that can be executed by procedure 700 (see FIG. 7) for generating the secret pseudo-random perturbation values for an enhanced watermark.

In particular, upon entry into procedure 800, execution first proceeds to block 810 which reads, from input data, secret value k and value N. Next, execution proceeds to block 820 which randomly selects an integer, K, within a set of integer values 1 to N inclusive. Thereafter, block 830 executes to determine K different subsets $\{S_1, S_2, \ldots, S_K\}$ of randomly selected integers, where each of the integers is a real value in the range of 1 to N inclusive. The number of integers contained in each of the subsets is also a integer value randomly selected between 1 to N inclusive. Once all these subsets have been determined, these subsets are saved for use in subsequently recovering the enhanced watermark from a test image(s). Then, execution proceeds to block 840. This block, when executed, determines the secret pseudo-random perturbation values such that the particular perturbation values, designated by the integers in each subset each multiplied by corresponding selected transform coefficients. Resulting products can optionally be summed to a predefined value, e.g., zero $$\left( \sum_{j \in S_i} \gamma_j M_j = 0 \right).$$

Hence, all the perturbation values collectively satisfy K separate mathematical constraints. Zero is chosen as the predefined value for the sum to simplify the computations, including during watermark recovery. As noted above, each of the K subsets ($S_i$) designates members of a subset of perturbation values ($\gamma_j$) and transform coefficients ($M_j$). Given the various constraints and a preference to limit each perturbation value to ±1 for computation simplicity, block 840 can utilize any one of a wide variety of conventional optimization algorithms well known in the art to determine each perturbation value, $\gamma_i$. Alternatively, each constraint could sum to a predefined non-zero value $\theta_i$. Hence, these predefined non-zero values would also be read by procedure 810 as input data. If such non-zero values were to be used, then, during watermark recovery, an appropriate and different threshold value would need to be used with each such subset of perturbation values. Once all N secret pseudo-random perturbation values are generated, execution exits from procedure 800.

Figure 9:
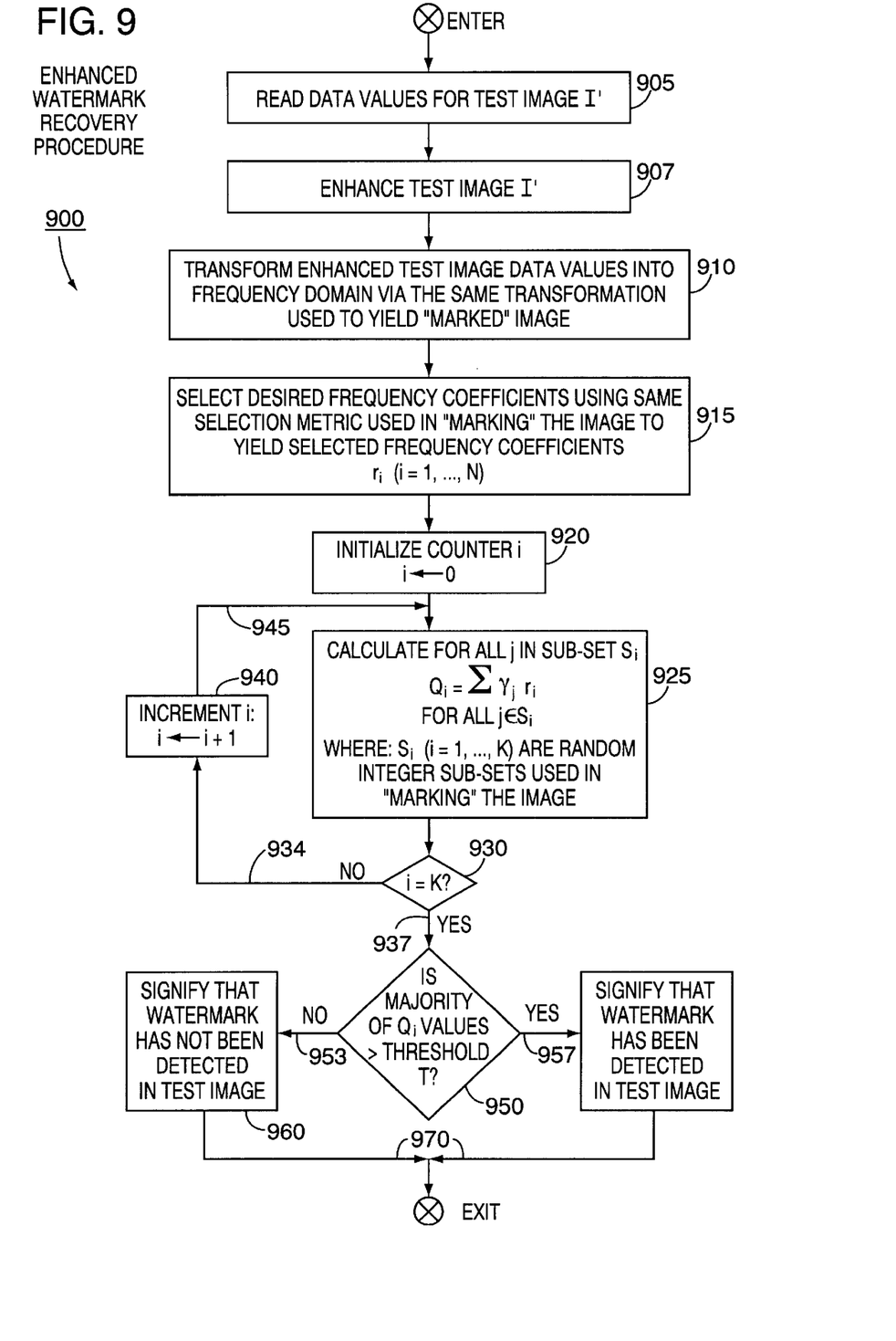
FIG. 9 depicts a flowchart of enhanced watermark recovery procedure 900 for recovering, from a test image, an enhanced watermark generated through use of procedure 800 shown in FIG. 8.

FIG. 9 depicts a flowchart of enhanced watermark recovery procedure 900 for recovering, from a test image, an enhanced watermark generated through use of procedure 800 shown in FIG. 8.

Upon entry into procedure 900, execution first proceeds to block 905 to read pixel values for a test image, I'. Once these values have been read, execution proceeds to block 907 which performs a conventional contrast-enhancement operation on the image. Thereafter, a resulting enhanced test image is applied to block 910. This block, when executed, transforms these pixel values in the enhanced image into the frequency domain using the same frequency transform as used in image marking procedure 700 (see FIG. 7) in marking an input image for which the test image is purportedly a copy. Thereafter, as shown in FIG. 9, execution proceeds to block 915 which selects desired ones of these coefficients (i.e., $r_i$, where i=1, . . . , N) using the same selection metric employed in procedure 700 for this test image. A probabilistic selection procedure (e.g., based on sorting by numerical values and thresholding) can be employed here to pick out a significant fraction of the coefficients originally used during watermarking. Next, execution proceeds to block 920 which initializes a value of counter i to zero. Once this occurs, a loop containing blocks 925–940 is entered to calculate a sum-product for each different subset of perturbation values and corresponding selected transform coefficients in the test image. To do so, block 925, when executed, accesses every perturbation value ($\gamma_j$) previously used to form the watermark in the test image and specified by a different member of the $i^{\underline{th}}$ subset of random integer values (S) used in marking that image, forms a product of each such perturbation value and its corresponding received transform coefficient ($r_i$), and forms a sum of the products, as given by equation (3) above. Once that sum-product for the $i^{\underline{th}}$ subset is fully computed, execution proceeds to decision block 930 which tests whether a current value of the counter. If the current value is less than the value K, then at least one subset of perturbation values, and associated transform coefficients, remains to be processed. In this case, decision block 930 routes execution, via NO path 934, to block 940. This latter block increments the value of counter i by one. Thereafter, execution loops back, via feedback path 945, to block 925 to compute the sum-product for the next subset of perturbation values, and so forth. Once sum-products for all K subsets have been computed, then decision block 930 routes execution, via YES path 937, to decision block 950. This latter decision block determines whether each one of the sum-products, for a majority of the subsets ($Q_i$) of the perturbation values present in the test image, exceeds a predefined threshold value, T. If so, then the test image contains the enhanced watermark. Consequently, decision block 950 routes execution, via YES path 957, to block 965. This latter block produces an appropriate output to signify the existence of the enhanced watermark in the test image. Hence, test image I' is viewed as a copy of original image I. Otherwise, if a majority of the sum-products do not exceed the threshold T, then decision block 950 routes execution, via NO path 953, to block 960. In this case, block 960 produces an output that signifies that the test image does not contain the enhanced watermark. After either of blocks 960 or 965 executes, execution then exits, via path 970, from routine 900. Alternatively., block 950 implements an "amplified" approach rather than a threshold based test. Specifically, once each $Q_i$ value is determined, an expression $L_i = [C/\text{Normalize}(Q_i)]$ is calculated, where C is an empirically determined constant. Then, given all the $L_i$ values, a conventional majority type rule can be used to determine if the enhanced watermark, $\gamma$, is present or not in the test image.

Unauthorized copying, as noted previously, is pervasive across different types of digital information, not just images. Clearly, those skilled in the art realize that, although the inventive embodiments are directed to use with images, our present invention can be advantageously used to indelibly, securely and integrally mark any of a wide variety of different types of digital information, such as large datasets, in order to subsequently and accurately detect copies of such information. However, to prevent any adverse affects that might result from use of the invention, the information needs to contain sufficient redundancies and/or its subsequent processing must be substantially unaffected by the rather small perturbations which the invention will introduce into the information (both of which are generally true for digitized images).

While we have described our invention in the context of using sum-products of the transform coefficients and perturbation values, clearly other mathematical functions of the two, such as, e.g., a sum of the products of each transform coefficient and a square of the corresponding perturbation value could be used instead. While many different functions could be used, the specific function chosen must provide sufficient sensitivity to changes in the perturbation values as well as be consistently used for both generating the enhanced watermark for inclusion in an image and detection of the watermark from suspected copies of that image.

Although an embodiment which incorporates the teachings of the present invention has been shown and described in detail herein, those skilled in the art can readily devise many other embodiments and applications of the present invention that still utilize these teachings.

We claim:

1. Apparatus for forming an identifier for an input image and for securely marking the input image with the identifier so as to yield a marked image, the apparatus comprising:

a processor; and a memory having computer executable instructions stored therein; and wherein the processor, in response to the executable instructions:

transforms pixel values for an input image, through a predefined transformation, into a predefined domain so as to define a plurality of transform coefficients;

generates a plurality of N (where N is an integer) pseudo-random perturbation values such that each different one of a plurality of randomly defined subsets, of the perturbation values and corresponding ones of the transform coefficients, satisfies a separate corresponding predetermined mathematical constraint, such that all of the perturbation values, in conjunction with all of the transform coefficients, satisfy a plurality of different predetermined mathematical constraints, wherein all the perturbation values collectively define the identifier;

modifies each of the transform coefficients by a corresponding one of the perturbation values so as to form a plurality of perturbed transform coefficients thereby; and inversely transforms, through an inverse application of the predefined transformation, the plurality of perturbed transform coefficients to pixel values so as to form output pixel values that collectively form the marked image.

2. The apparatus in claim 1 wherein the processor, in response to the stored instructions, generates the perturbation values in response to a secret input value k.

3. The apparatus in claim 2 wherein the processor, in response to the stored instructions:

forms a sum-product of ones of the perturbation values and the corresponding ones of the transform coefficients in each of the randomly defined subsets so as to define a plurality of sum-products; and sets all the perturbation values such that each of the sum-products equals zero or a separate corresponding predefined finite value.

4. The apparatus in claim 3 wherein the processor, in response to the stored instructions:

randomly selects an integer value K within a set of integers from 1 to N; and specifies K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

5. The apparatus in claim 3 wherein the transformation is a frequency transformation.

6. The apparatus in claim 5 wherein the frequency transformation comprises a wavelet, a discrete cosine transformation (DCT) or a Fourier transformation.

7. The apparatus in claim 3 wherein each of the perturbation values is either +1 or −1.

8. The apparatus in claim 2 wherein the processor, in response to the stored instructions and prior to generating the perturbation values, selects, according to a predefined selection metric, particular ones of the plurality of transform coefficients so as to yield N selected transform coefficients for subsequent use as the transform coefficients.

9. The apparatus in claim 8 wherein the processor, in response to the stored instructions:

forms a sum-product of ones of the perturbation values and the corresponding ones of the transform coefficients in each of the randomly defined subsets so as to define a plurality of sum-products; and sets all the perturbation values such that each of the sum-products equals zero or a separate corresponding predefined finite value.

10. The apparatus in claim 9 wherein the processor, in response to the stored instructions:

randomly selects an integer value K within a set of integers from 1 to N; and specifies K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

11. The apparatus in claim 9 wherein the transformation is a frequency transformation.

12. The apparatus in claim 11 wherein the frequency transformation comprises a wavelet, a discrete cosine transformation (DCT) or a Fourier transformation.

13. The apparatus in claim 9 wherein the selection metric selects the particular ones of the transform coefficients as those ones of the transform coefficients associated with frequency components that collectively possess at least a predefined portion of total optical power present in the input image.

14. The apparatus in claim 13 wherein the predefined portion is at least 90%.

15. The apparatus in claim 9 wherein each of the perturbation values is either +1 or −1.

16. For use with a computer system having a processor and a memory, the memory having computer executable instructions stored therein, a method for forming an identifier for an input image and for securely marking the input image with the identifier so as to yield a marked image, the method, implemented by the processor and in response to the executable instructions, comprising the steps of:

transforming pixel values for an input image, through a predefined transformation, into a predefined domain so as to define a plurality of transform coefficients;

generating a plurality of N (where N is an integer) pseudo-random perturbation values such that each different one of a plurality of randomly defined subsets, of the perturbation values and corresponding ones of the transform coefficients, satisfies a separate corresponding predetermined mathematical constraint, such that all of the perturbation values, in conjunction with all of the transform coefficients, satisfy a plurality of different predetermined mathematical constraints, wherein all the perturbation values collectively define the identifier;

modifying each of the transform coefficients by a corresponding one of the perturbation values so as to form a plurality of perturbed transform coefficients thereby; and     inversely transforming, through an inverse application of the predefined transformation, the plurality of perturbed transform coefficients to pixel values so as to form output pixel values that collectively,form the marked image.

17. The method in claim 16 wherein the generating step comprises generating the perturbation values in response to a secret input value k.

18. The method in claim 17 wherein the generating step further comprises the steps of:

forming a sum-product of ones of the perturbation values and the corresponding ones of the transform coefficients in each of the randomly defined subsets so as to define a plurality of sum-products; and     settings all the perturbation values such that each of the sum-products equals zero or a separate corresponding predefined finite value.

19. The method in claim 18 wherein the generating step further comprises the steps of:

randomly selecting an integer value K within a set of integers from 1 to N; and     specifying K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

20. The method in claim 18 wherein the transformation is a frequency transformation.

21. The method in claim 20 wherein the frequency transformation comprises a wavelet, a discrete cosine transformation (DCT) or a Fourier transformation.

22. The method in claim 18 wherein each of the perturbation values is either +1 or −1.

23. The method in claim 17 further comprising the step, prior to generating the perturbation values, of selecting, according to a predefined selection metric, particular ones of the plurality of transform coefficients so as to yield N selected transform coefficients for subsequent use as the transform coefficients.

24. The method in claim 23 wherein the generating step further comprises the step of:

forming a sum-product of ones of the perturbation values and the corresponding ones of the transform coefficients in each of the randomly defined subsets so as to define a plurality of sum-products; and     setting all the perturbation values such that each of the sum-products equals zero or a separate corresponding predefined finite value.

25. The method in claim 24 wherein the generating step further comprises the steps of:

randomly selecting an integer value K within a set of integers from 1 to N; and     specifying K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

26. The method:in claim 24 wherein the transformation is a frequency transformation.

27. The method in claim 26 wherein the frequency transformation comprises a wavelet, a discrete cosine transformation (DCT) or a Fourier transformation.

28. The method in claim 24 wherein the selection metric selects the particular ones of the transform coefficients as those ones of the transform coefficients associated with frequency components that collectively possess at least a predefined portion of total optical power present in the input image.

29. The method in claim 28 wherein the predefined portion is at least 90%.

30. The method in claim 24 wherein each of the perturbation values is either +1 or −1.

31. A computer readable medium having computer executable instructions stored therein for performing the steps of claim 16.

32. An image securely marked with an identifier and generated by a computer system, the system having a processor and a memory, the memory having computer executable instructions stored therein, characterized by the image having being produced by the steps, implemented by the processor in response to the executable instructions, recited in claim 16.

33. The image of claim 32 further produced through the step of generating the perturbation values in response to a secret input value k.

34. The image in claim 33 further produced through the steps of:

forming a sum-product of ones of the perturbation values and the corresponding ones of the transform coefficients in each of the randomly defined subsets so as to define a plurality of sum-products; and     settings all the perturbation values such that each of the sum-products equals zero or a separate corresponding predefined finite value.

35. The image in claim 34 further produced through the steps of:

randomly selecting an integer value K within a set of integers from 1 to N; and     specifying K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

36. The image in claim 34 wherein the transformation is a frequency transformation.

37. The image in claim 36 wherein the frequency transformation comprises a wavelet, a discrete cosine transformation (DCT) or a Fourier transformation.

38. The image in claim 34 wherein each of the perturbation values is either +1 or −1.

39. The image in claim 33 further produced through the step of, prior to generating the perturbation values, of selecting, according to a predefined selection metric, particular ones of the plurality of transform coefficients so as to yield N selected transform coefficients for subsequent use as the transform coefficients.

40. The image in claim 39 further produced through the steps of:

forming a sum-product of ones of the perturbation values and the corresponding ones of the transform coefficients in each of the randomly defined subsets so as to define a plurality of sum-products; and setting all the perturbation values such that each of the sum-products equals zero or a separate corresponding predefined finite value.

41. The image in claim 40 further produced through the steps of:

randomly selecting an integer value K within a set of integers from 1 to N; and specifying K subsets of random integers (S), wherein each of the integers is randomly selected from the integer set of 1 to N and a number of integers in each of the K subsets is also randomly selected from the integer set of 1 to N, each of the K subsets designating particular ones of the pluralities of perturbation values and associated transform coefficients that form a corresponding one of the randomly defined subsets.

42. The image in claim 40 wherein the transformation is a frequency transformation.

43. The image in claim 42 wherein the frequency transformation comprises a wavelet, a discrete cosine transformation (DCT) or a Fourier transformation.

44. The image in claim 40 wherein the selection metric selects the particular ones of the transform coefficients as those ones of the transform coefficients associated with frequency components that collectively possess at least a predefined portion of total optical power present in the input image.

45. The image in claim 44 wherein the predefined portion is at least 90%.

46. The image in claim 40 wherein each of the perturbation values is either +1 or −1.

* * * * *